United States Patent [19]

Panuska et al.

[11] 4,446,686

[45] May 8, 1984

[54] METHODS OF AND APPARATUS FOR CONTROLLING CORE-TO-SHEATH LENGTH RATIO IN LIGHTGUIDE FIBER CABLE AND CABLE PRODUCED BY THE METHODS

[75] Inventors: Andrew J. Panuska, Lilburn; Manuel R. Santana, Doraville; Robert B. Sprow, Dunwoody, all of Ga.

[73] Assignees: AT&T Technologies, Inc., New York, N.Y.; AT&T Bell Laboratories, Murray Hill, N.J.

[21] Appl. No.: 414,229

[22] Filed: Sep. 2, 1982

[51] Int. Cl.³ .......................... G02B 5/16; G02B 5/14; H01B 13/14
[52] U.S. Cl. .............................. 57/6; 57/7; 57/9; 350/96.23
[58] Field of Search ......................... 57/6-9, 57/13-15, 16-18; 350/96.23; 156/148, 47, 51-53

[56] References Cited

U.S. PATENT DOCUMENTS

| | | | |
|---|---|---|---|
| 4,129,468 | 12/1978 | Knab | 156/148 |
| 4,153,332 | 5/1979 | Longoni | 350/96.23 |
| 4,154,049 | 5/1979 | King et al. | 57/9 |
| 4,195,468 | 4/1980 | King et al. | 57/9 |
| 4,205,899 | 6/1980 | King et al. | 350/96.23 |
| 4,241,979 | 12/1980 | Gagen et al. | 350/96.23 |
| 4,248,035 | 2/1981 | Skillen et al. | 57/6 |
| 4,388,799 | 6/1983 | Vives | 57/6 |

Primary Examiner—John Petrakes
Attorney, Agent, or Firm—E. W. Somers

[57] ABSTRACT

In the manufacture of a lightguide fiber cable (21) in which a lightguide fiber core (32) is loosely disposed in a composite sheath 40 it is important to control the ratio of the lengths of the core and sheath. A core which is shorter than the sheath and which follows a shortened path on a reel may be unduly strained when the cable is installed in the field. This problem is overcome by coupling the core to the sheath by a system (25) which includes a constant speed linear capstan (146) and a relatively large variable speed sheave (150) that is positioned between the linear capstan and a takeup reel (154). The coupling of the core to the sheath is accomplished on the sheave after the sheath is elongated between the linear capstan and the sheave. The coupling and the elongation cooperate to compensate for the inherent shortfall in core length which otherwise would occur when the cable is wound on a reel. As a result, when tension forces that have been applied to the sheath are reduced, the sheath, which includes strength members having a relatively high modulus of elasticity, recovers to its original length and the ratio of the length of the core to that of the sheath becomes a predetermined value.

23 Claims, 11 Drawing Figures

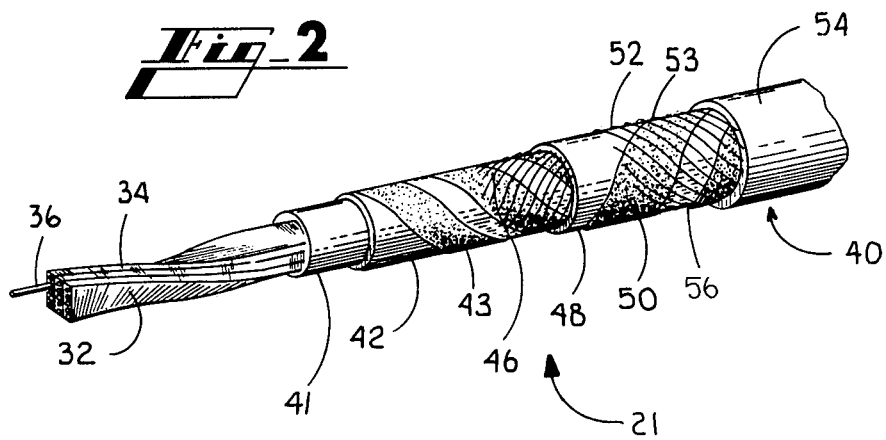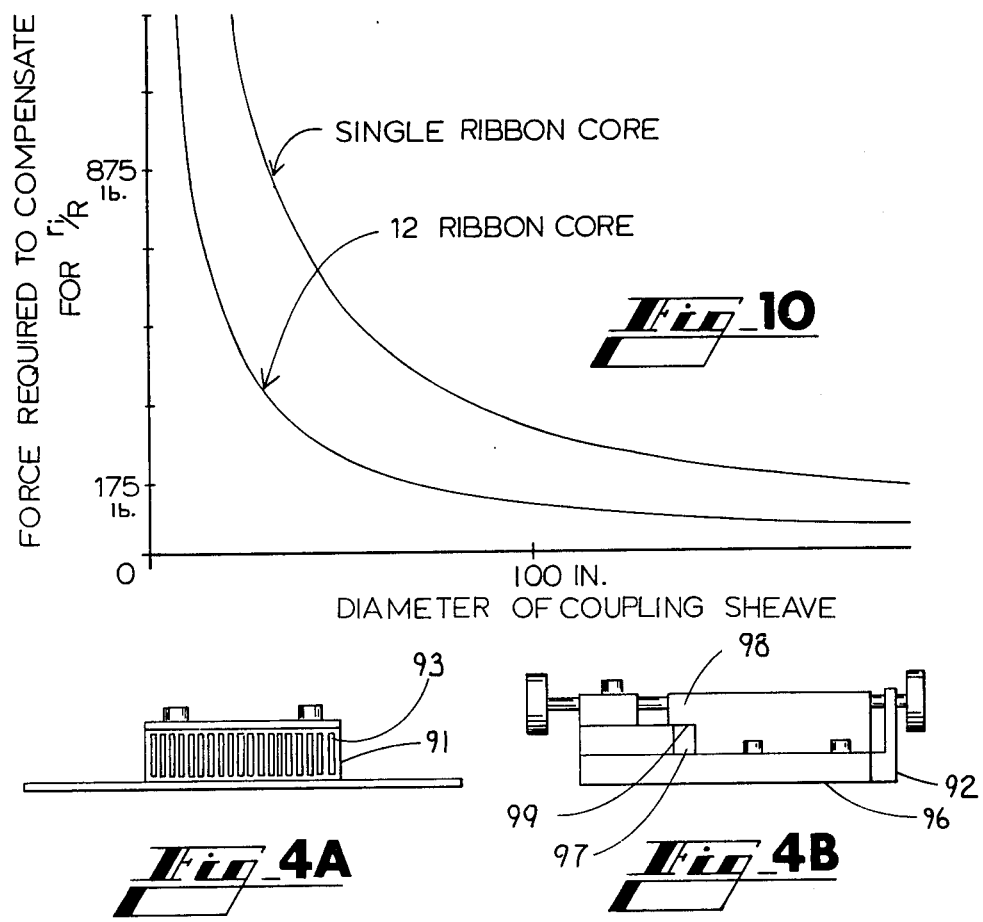

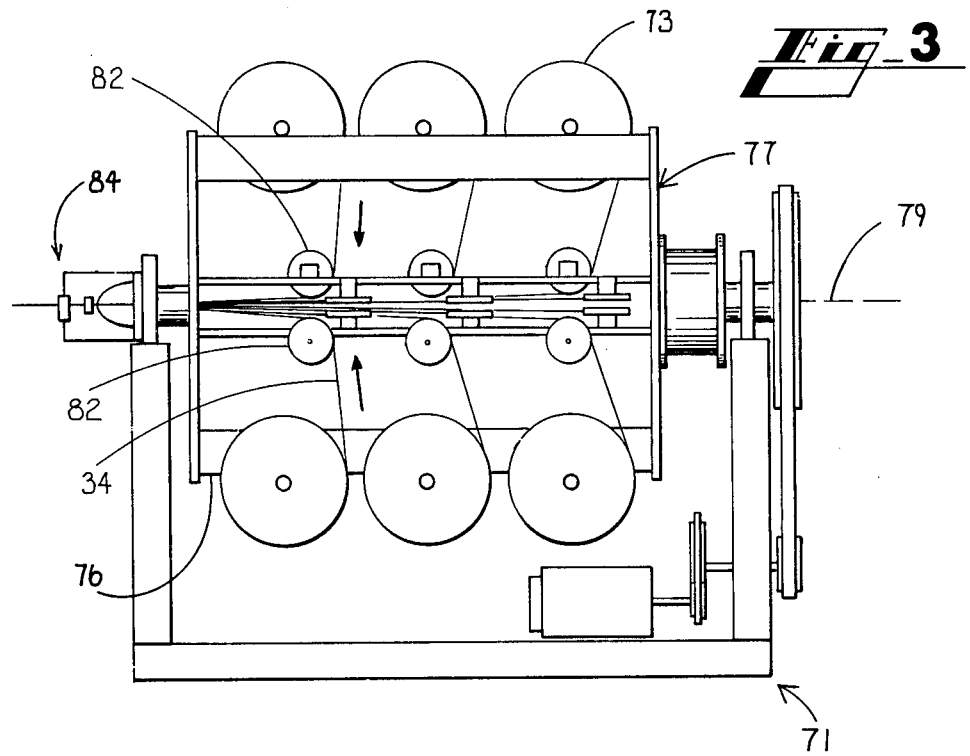
Fig_3
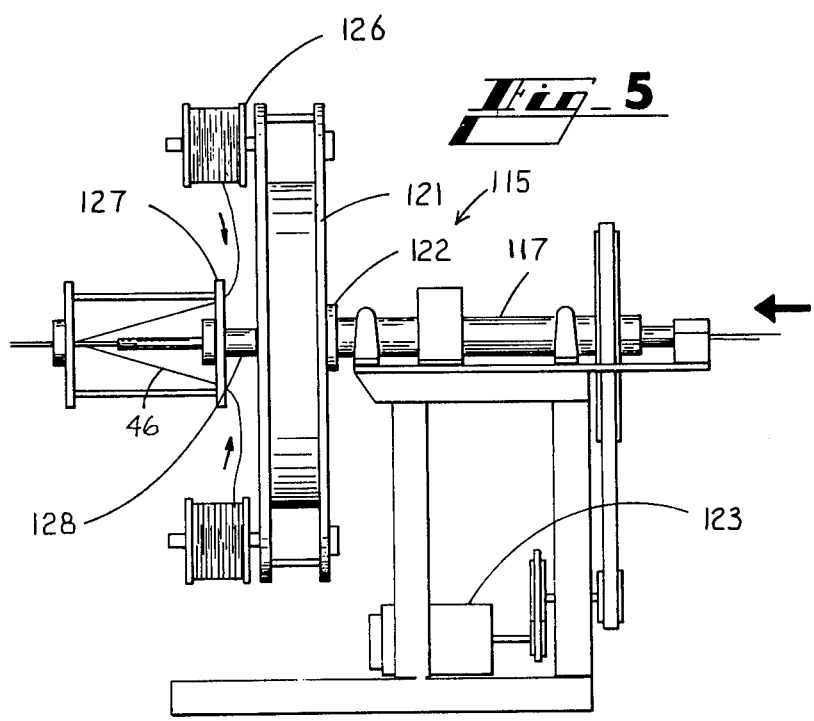
Fig_5

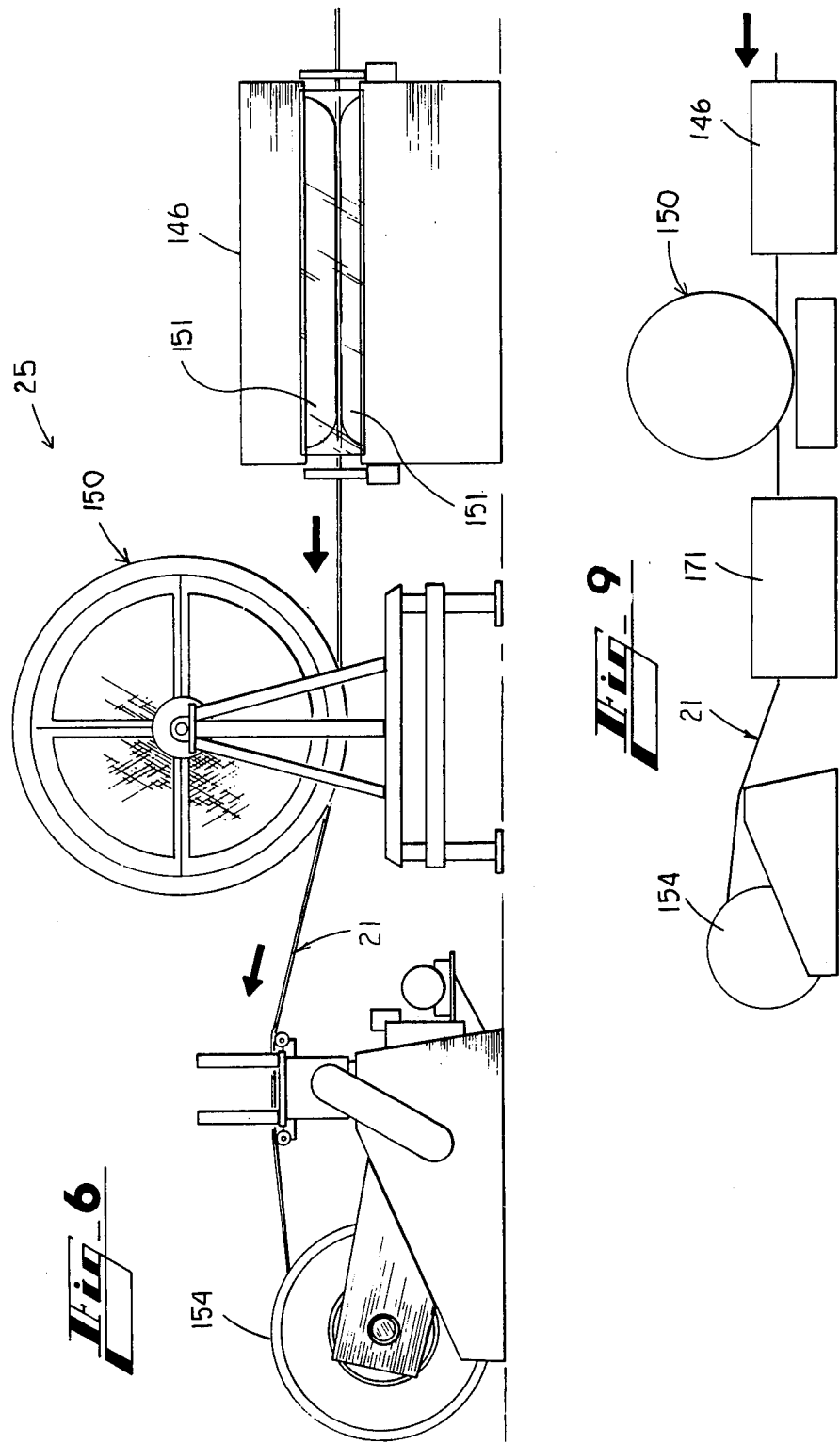

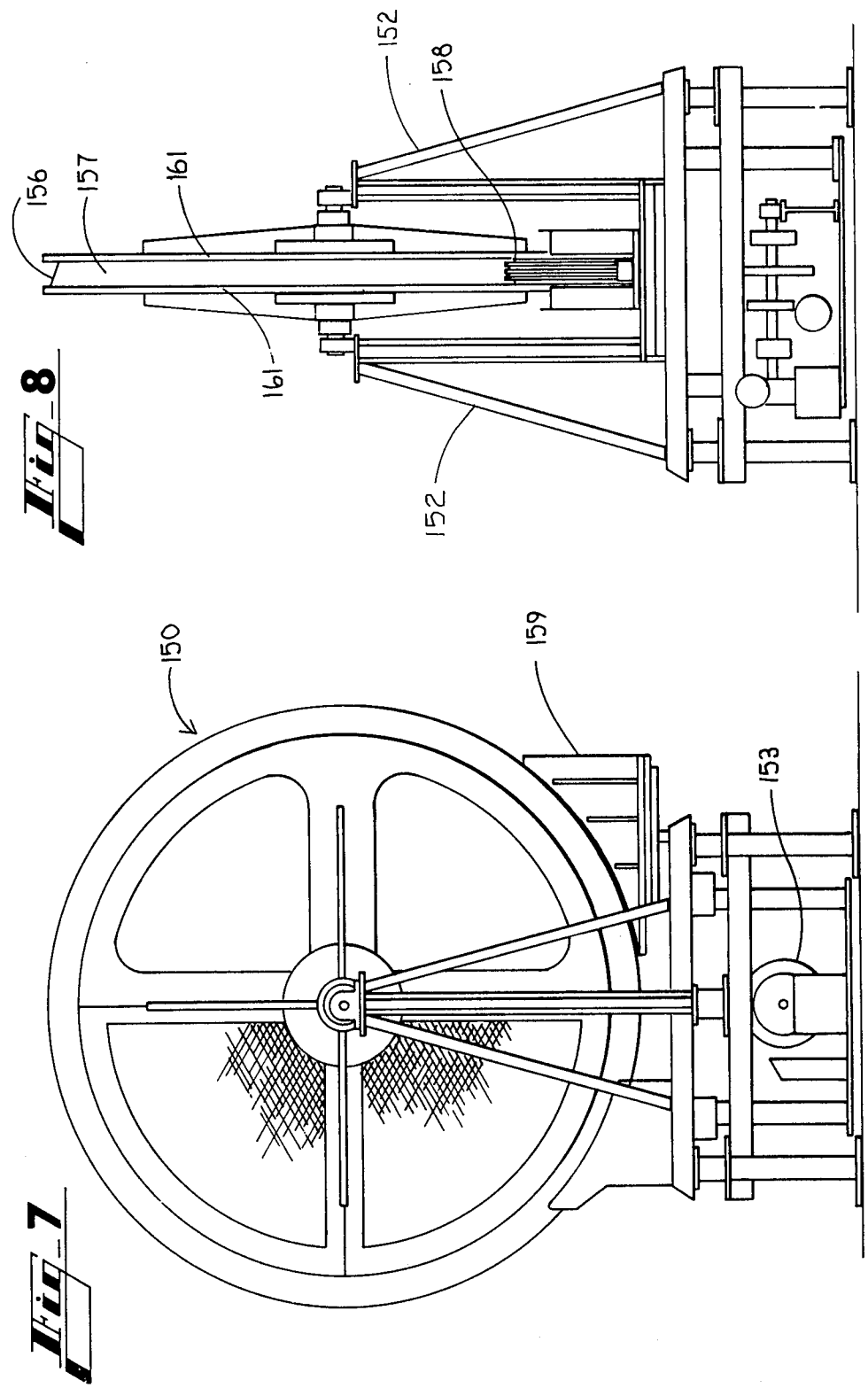

METHODS OF AND APPARATUS FOR CONTROLLING CORE-TO-SHEATH LENGTH RATIO IN LIGHTGUIDE FIBER CABLE AND CABLE PRODUCED BY THE METHODS

TECHNICAL FIELD

This invention relates to methods of and apparatus for controlling the core-to-sheath length ratio in lightguide fiber cable. More particularly, it relates to the manufacture of an optical fiber cable which is not unduly stressed when installed in the field.

BACKGROUND OF THE INVENTION

As is well known, a lightguide fiber is an elongated glass element, which is provided with a protective coating and which has a diameter on the order of 125 microns. It comprises a cylindrical core having a predetermined refractive index and a covering layer having a different refractive index which is smaller than that of the core. Because of the difference between the refractive index of the core and that of the covering layer, a light beam entering at one end of the fiber with a sufficiently small angle of incidence with respect to the axis of the fiber is reflected inside the core and transmitted from one end of the fiber to the other.

Lightguide fiber cables have been made by first assembling up to twelve fibers side-by-side in a parallel array sandwiched between plastic layers to form a ribbon. A plurality of these ribbons are formed into a core which is wrapped with a plastic material such as TEFLON ® plastic that provides thermal protection and that serves to minimize the friction between the core and an adjacent layer of the cable. Then the core and its plastic wrap are enclosed in a composite sheath comprising layers of plastic and stainless steel wires which are referred to as strength members. Typically, the layers of ribbons follow an undulated path within an inner jacket of the sheath. See U.S. Pat. No. 4,241,979 which issued on Dec. 30, 1980 in the names of P. F. Gagen and M. R. Santana.

The implementation of lightguide fiber systems entails some difficulties of a mechanical nature because of the low values of tensile strength and of ultimate elongation of the fibers. The manufacture and installation of lightguide fiber cable must be accomplished while limiting the magnitude of the stresses and deformation which can adversely affect the fibers. Tensions on the ribbons, the wires and on the cable are among the critical variables that must be controlled to avoid any undue compressive or tensile stresses and, in turn, any added fiber loss.

Production lengths of lightguide cable are typically one or two kilometers. Shipping lengths vary widely, depending on customer requirements. Production lengths are cut to a customer's specified length prior to termination. Cables are connectorized prior to shipment and lengths must be precise so that the cables can be installed without slack.

During the fabrication of lightguide fiber cable, one of the most critical parameters is the ratio of the core length to the sheath length. These two lengths are not necessarily the same. In a completed lightguide cable, relative movement can occur between the core and the sheath because of the clearance on sides of the core and the relatively low coefficient of friction between the core and its plastic wrap. The core is said to be loosely coupled to the sheath. While this may be desirable in the completed cable, it presents a problem during cable manufacture. As the cable is taken up on a reel, the back tension of each ribbon, even though only one to three ounces, causes a reduction in core length relative to the sheath. Less core per unit length of sheath is taken up on the reel. This occurs because the core does not remain at the sheath centerline, but rather moves in toward the center of each convolution on the reel away from the neutral axis of the sheath, following a shorter path than the sheath. The effect is greatest for single ribbon cores and least, but still significant, for twelve ribbon cores.

The cable ends are terminated while the cable is on the reel; therefore any discrepancy between the core length and the sheath length is not translated into undue strains in the cable on the reel. But, when the cable is payed off the reel and installed in the field, the core is moved toward the center of the sheath cross-section and since it is shorter than the sheath, the core becomes unduly strained.

The desired core-to-sheath length ratio for the cable described hereinbefore is 1.0000 but a range of 1.0000 to 1.0007 is acceptable. A wider range might be acceptable as a compromise, but any ratio below 1.0000 could be expected to reduce the life of the fiber since it would be in tension when the cable is payed out from the reel into a generally straight configuration. Ratios much above 1.0007 for the above-described cable can be expected to increase the microbending loss because the compressive load on the core would be excessive.

Relative movement between the core and the sheath could be prevented by using a cabling line of sufficient length to insure coupling of the core to the sheath by friction. For cables manufactured on such a line, the core-to-sheath ratio would be effectively 1.000. Operation of the line would be the same for all cable core constructions. It has been determined that before a first turn of a fully jacketed cable, the line length required for coupling by this method is about 1200 feet. While it is possible to build and operate, a line of such length presents many operating difficulties and increases the cost of the equipment as well as that of product. The long line approach cannot be considered a satisfactory solution to the problem.

If the ribbon and core wrap could be supplied from payouts to the formed sheath at zero back tension, it would seem that the desired core-to-sheath length ratio could be met within the presently used line. This method depends on the successful design of an apparatus to pay out the ribbon and core wrap without any back tension. While some designs have been proposed, none are considered satisfactory for all core constructions.

U.S. Pat. No. 4,153,332 addresses the problem of coupling between a single lightguide fiber and an enclosing plastic tube, a plurality of which are subsequently formed into a cable. An optical fiber is coated with an antiadhesive material before a tube is extruded thereover. The tube is elongated during its passage between a brake and a drawing capstan which permits relative sliding between the tube and the fiber. In the drawing capstan, the tube and the lightguide element are advanced in a number of turns between two sheaves of unequal diameter. Thereafter, the elongation of the tube is eliminated. As it is taken up on a collecting drum, the tube shortens and causes the fiber to become wavy so that the stretched length of the fiber is greater than the length of the tube.

It has been found that the wrapping of a coupled cable about a capstan including unequal diameter sheaves presents a problem. At each sheave in the manufacturing line for lightguide fiber cable, the plastic core wrap, being under tension, assumes the shortest path. Because the ribbon or ribbon array is captured inside the core wrap and is also under tension, it takes the shortest path. With the ribbon shorter than the sheath in a subsequent straight section, tension increases and intensifies the effect at the second sheave, if the diameter of the second sheave or takeup reel is larger than that of the first sheave.

None of the above-mentioned apparatus provide totally satisfactory solutions to the problem of substantially precisely controlling core-to-sheath length for a lightguide fiber cable. Passive line components would be acceptable if any offered both control of coupling and reasonable operating conditions. However, a cable manufacturing line that is about 1000 feet long cannot be considered reasonable from the operating point of view.

SUMMARY OF THE INVENTION

The foregoing problems of the prior art relating to core-to-sheath length ratio of a lightguide cable have been overcome by the methods and apparatus of this invention. A method is provided for controlling the length of a core comprising lightguide fibers to the length of a sheath comprising at least one plastic jacket and a plurality of relatively high tensile strength members which extend coextensively with the core. The method comprises the steps of advancing a cable comprising the core of lightguide fibers and the composite sheath along a path, and elongating the sheath relative to the core along a portion of the path by applying tensile forces to the sheath. The core is coupled to the sheath to prevent relative movement therebetween by moving the cable in a predetermined number of circular convolutions each of which has a diameter that exceeds the diameter of any subsequent convolution in which the coupled cable is wound. This allows sufficient additional length of the core to be advanced relative to the sheath to cause the ratio of the lengths of the core and sheath to be a predetermined value when the tensile forces are reduced to decouple the cable and to allow the composite sheath to return elastically to its original length.

An apparatus for causing the core-to-sheath ratio of a cable which comprises a lightguide fiber core disposed within a composite sheath system includes means for supplying a plurality of lightguide fibers, and extrusion means for enclosing the fibers in the sheath system. The composite sheath system includes at least one plastic jacket and a plurality of strength members having a relatively high modulus of elasticity and extending coextensively with said core. The apparatus also includes moving means for advancing the cable along a path of travel and at a substantially constant velocity along a straight portion of the path of travel, and means including a reel for taking up the cable. A relatively large sheave interposed between the moving means and the takeup reel cooperates with the moving means to elongate the sheath relative to the core along the straight portion of the path by applying tensile forces to the sheath, and to couple the core to the sheath to prevent relative movement therebetween. The relatively large diameter sheave has a diameter which is greater than the diameter of any subsequent convolution in which the coupled cable is wound. This arrangement allows sufficient additional length of the core to be advanced relative to the sheath to cause the length of the core to be substantially equal to that of the sheath when the tensile forces are reduced and the composite sheath recovers to its original length.

BRIEF DESCRIPTION OF THE DRAWINGS

Other features of the present invention will be more readily understood from the following detailed description of specific embodiments thereof when read in conjunction with accompanying drawings, in which:

FIG. 2 is a perspective view of a cable which is made with the line of FIG. 1;

FIG. 3 is an elevational view of an optical fiber ribbon payout portion of the apparatus of FIG. 1;

FIGS. 4A and 4B are elevational views of a ribbon aligning portion of the apparatus;

FIG. 5 is an elevational view of a strength member payout device;

FIG. 6 is an elevational view of a portion of the apparatus of FIG. 1 showing apparatus of this invention for controlling the ratio of lengths of a lightguide fiber cable core and a composite sheath;

FIG. 7 is an elevational view of a sheave which is included in the portion of the apparatus shown in FIG. 6;

FIG. 8 is an end view of the sheave of FIG. 7;

FIG. 9 is an alternate embodiment of the portion of the line which is shown in FIG. 6; and FIG. 10 is a graph which depicts the force required for elongating the sheath as a function of the diameter of the sheave of FIG. 7.

DETAILED DESCRIPTION

Figure 1:
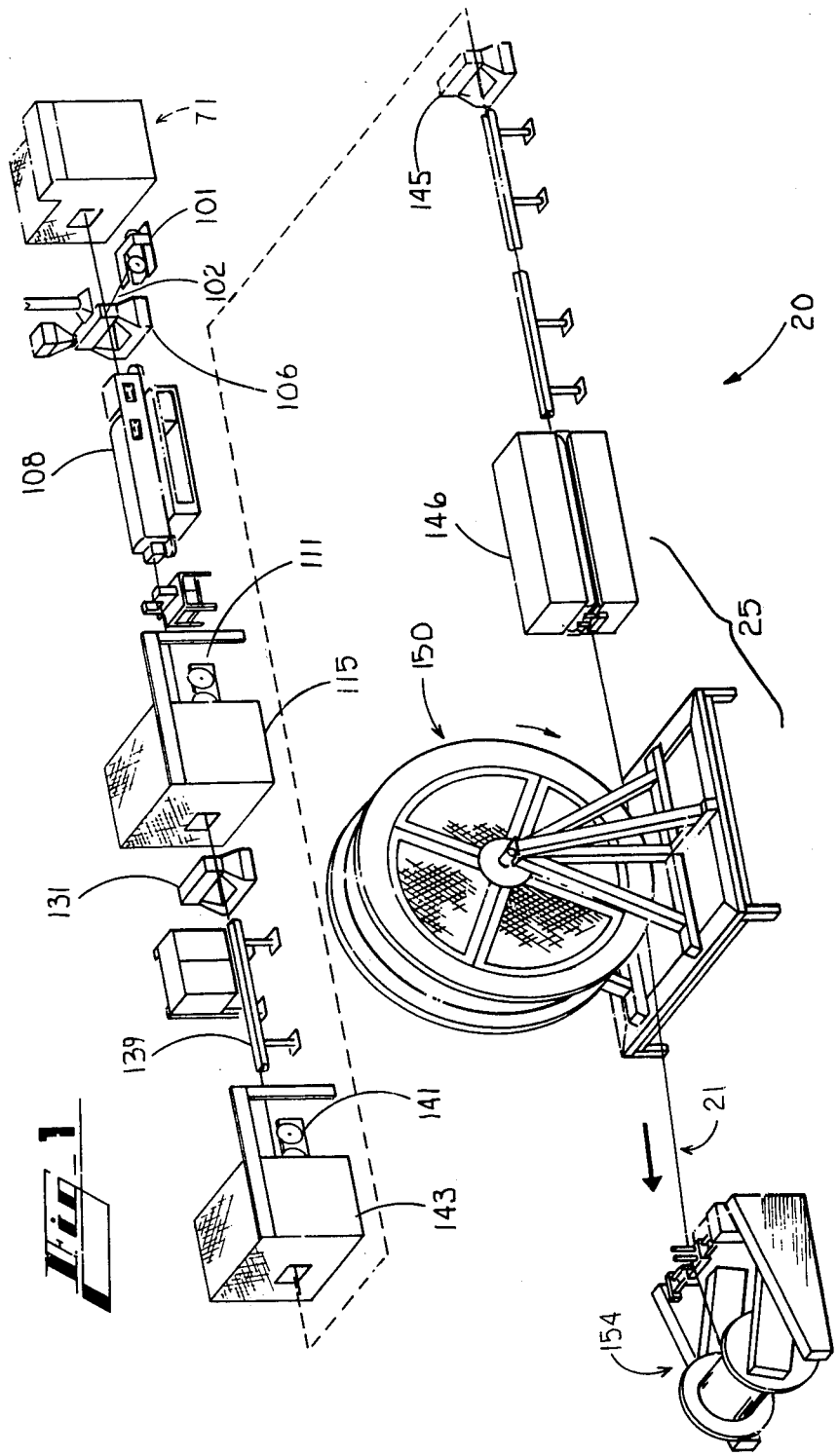
FIG. 1 is an overall view of a manufacturing line for making a lightguide fiber cable.

Referring now to FIG. 1, there is shown an apparatus which is designated generally by the numeral 20 for making a cable 21 (see FIG. 2). The apparatus 20 includes apparatus designated generally by the numeral 25 for coupling the components of the cable 21 to prevent undue strain in the cable when it is installed in the field.

The cable 21 comprises a core 32 of lightguide fiber ribbons 34, with each ribbon 34 comprising a plurality of light-transmitting optical fibers 36—36. Surrounding the core 32 is a cable sheath 40 which in a preferred embodiment is a composite arrangement comprising plastic material and highly elastic strength members.

The cable 21 comprises a thermal barrier core wrap 41 which is made of an insulative material such as a synthetic resin polymer tape. In a preferred embodiment, the thermal barrier layer 41 is made of TEFLON® plastic material. Such a material has a relatively low coefficient of friction which allows the core to move relative to the sheath 40.

The sheath 40 also includes a plastic-extruded inner tubular jacket 42 which together with the core wrap 41 forms a tube for loosely containing the core 32, a first reinforcement bedding layer 43 or a vapor barrier layer, and a layer or group of reinforcing strength members 46—46. These are enclosed by a first extruded plastic outer jacket 48, a second reinforcement bedding layer 50, a second layer 52 of strength members 53—53 and a second extruded plastic outer jacket 54. The jackets are made of polyethylene although other plastics can be used, including a different plastic for each jacket.

In the FIG. 2 cable, the bedding layer 50 may be helically or longitudinally applied and in a manner to form a gap 56 that becomes a strength member encapsulating region. The bedding layer or layers are made of a thin layer, e.g. 0.020-0.025 cm, of spunbonded polyester.

The strength members 46—46 and 53—53 become an integral part of the sheath 40 and function together with the jacketing as a unit. The strength members 46—46 and 53—53 are characterized by a high tensile modulus i.e. in the range of about 10,000,000 to 30,00,000 psi and a strain at break greater than that of the glass optical fibers. The strength members 46—46 and 53—53 are stainless steel wires in the FIG. 2 cable. However, other materials, metallic or nonmetallic, such as graphite or aramid rods or Kevlar yarn can be used. Also, the strength members can be composite structures comprising any of a number of high modulus materials.

The apparatus 20 which is shown in FIG. 1, except for the apparatus 25 of this invention, is similar to that shown in U.S. Pat. No. 4,129,468 which issued in Dec. 12, 1978 in the name of E. D. Knab and which is incorporated by reference hereinto. The apparatus 20 is used to manufacture the cable 21 which comprises the core 32 including a helically twisted stacked array of lightguide fiber ribbons and a sheath.

In the apparatus 20, a payout 71 (see FIGS. 1 and 3) is provided for supplying a plurality of the lightguide fiber ribbons 34—34. Each of the ribbons 34—34 is payed out from a spool 73 which is mounted on a support platform 76 of a drum-type strander 77. The strander 77 rotates about an axis designated 79 which is substantially coincident with the axis of travel of the cable 21. The strander 77 is driven at a predetermined rotational speed to strand the ribbons 34—34 into a desired twist. The supply spools 73—73 are mounted rotatably on either side of the axis 79 such that their axes of rotation are generally perpendicular to the path of travel of the cable. The supply spools are tensioned by brakes (not shown) with a controlled force to apply a desired back tension to the ribbons. The payout 71 also includes a plurality of idler sheaves 82—82 which are effective for guiding the ribbons 34—34. The idler sheaves 82—82 are designed to feed the ribbons into predetermined coplanar and parallel paths preparatory to their further movement along the line.

After the ribbons 34—34 have been moved past the sheaves 82—82, they are moved through a ribbon aligning device 84 (see FIGS. 4A and 4B). The device 84 includes a comb 91 and a ribbon stacking guide 92. The comb 91 is effective to support the ribbons 34—34 as they are moved into converging relationship through the guide 92. The comb 91 includes a plurality of openings 93—93 each of which is adapted to pass a ribbon 34. The guide 92 comprises a baseplate 96 with a ribbon guiding channel 97 and a coverplate 98. The ribbon guiding channel 97 is formed by an indented top surface 99 and tapering interior side walls of the baseplate 96. The surface 99 and the coverplate 98 align the ribbons 34—34 vertically while the side walls urge the ribbons horizontally into a stacked array.

It has been the practice to restrain the twist as generated by the rotation of the strander drum 77 from propagating back toward the idler sheaves 82—82. The device 84 restrains the twist and facilitates the gradual twisting of the ribbon stack and prevents any abrupt torsional or bending motion. A controlled amount of force is applied to the stacked array to ensure that the ribbons 34—34 do not slip with respect to each other or buckle when helically stranded and that they exit the twist restraining facilities in a unitary structure.

After the ribbons 34—334 have been stacked and stranded, they are moved through a device 101 which wraps a TEFLON ® plastic tape 102 about the core 32 to form the core wrap 41. The tape 102 is wrapped longitudinally about the core 32 to form a tube having an overlapped seam.

Then the enclosed core 32 is advanced through an extruder 106 which causes a plastic material to be extruded about the enclosed core to form the inner jacket 42. From the extruder 106, the jacketed core is passed through a cooling trough 108 which is exposed to a negative pressure. This causes the jacket to expand away from the core 32 and be sized externally as it cools. As a result, a loose fitting tube is formed about the core 32 which permits relative movement between the core and the tube and the subsequently applied portions of the sheath system.

Afterwards, the cooled and jacekted core 32 is moved through a device 111 which applies a bedding layer of spunbonded polyester material or a vapor barrier about the jacket. The bedding layer is applied helically or longitudinally about the jacketed core and may be in a manner which causes either gaps or butted seams to be formed. If a vapor barrier is used, it is formed with a longitudinal overlapped seam.

Then the jacketed core is advanced through a payout assembly 115 (see FIGS. 1 and 5) for the longitudinal strength members 46—46. The payout assembly 115 comprises a drive shaft 117 which includes a passageway through which the inner cable structure passes. It also includes a disc-like board 121 which mounts fixedly at its center to the drive shaft 117, a stationary bearing assembly 122 which holds the drive shaft in axial alignment with the cable axis, and a drive linkage which operates from and turns the drive shaft 117 when it is driven by a motor 123.

Mounted on the board 121 are a plurality of spools 126—126 of lengths of strength members and a guiding ring 127 which is anchored to the board 121 through a bushing 128 and in axial alignment with the passageway. A controlled amount of back tension is applied to the spools 126—126 which are attached to the spool spindles. The payout assembly 115 is effective to wrap the strength members 46—46 in spaced relation to each other helically about the inner bedding layer 43.

The inner cable structure is moved through an extruder 131 which applies an intermediate jacket. The structure passes through the passageway and guiding ring of the payout assembly 115 and then through the core tube of the extruder 131. At the same time, the strength members 46—46 are fed from the supply spools 126—126 and threaded through guiding ring 127 so that they are directed to travel in substantially longitudinal paths adjacent to the inner cable structure. The inner cable structure and the strength members 46—46 are directed into their assigned positions for the final cable structure. The strength members enter into the predetermined helical lay prior to their entry into the extruder. Back tension at the payout 115 holds the strength members 46—46 taut as they enter the extruder. This tension also aids in holding the strength members in their precise positions as they are being covered by the plastic extrudate.

Following extrusion of the intermediate jacket 48 about the inner cable structure and its cooling in a trough 139, the bedding layer 50 is applied by a device 141. Then the partially completed cable structure is advanced through a second strength member payout assembly 143 and an extruder 145 which are similar to the payout assembly 115 and the extruder 131. These are effective to cause the second layer 52 of strength members 53—53 to be wrapped helically about the intermediate jacket and the outer jacket 54 to be extruded thereover.

Advantageously, the FIG. 2 cable is a torque-balanced cable. The two layers of strength members are helically wrapped in opposite directions with predetermined lays so that under a tensile load the two layers produce equal but oppositely directed torques about the longitudinal axis of the cable. This advantageously eliminates torsional creep or twisting that can otherwise occur when the cable 21 is exposed to sustained tensile loads.

After the extrusion of the outer jacket 54, but before the cable 21 is taken up, the core 32 is caused to be coupled to the sheath 40 after the sheath has been elongated by a predetermined amount. Coupling as applied to the manufacture of the cable 21 in accordance with this invention connotes that the relative movement between the core 32 and the sheath 40 is substantially zero.

The apparatus 25 is effective to elongate the sheath 40 by the application of tensile forces to allow the core 32 to move relative to the sheath. After the sheath 40 has been extended relative to the core 32, the core is coupled to the sheath as a result of the friction between the wrap 41 and the core to prevent relative movement between the core and the sheath. The coupling is temporary inasmuch as the core 32 is subsequently decoupled from the sheath 40 so that relative movement can occur therebetween. The sheath 40 recovers elastically in the absence of tension because of its composite structure which includes the strength members having a relatively high modulus of elasticity. It is important that the strength members 46—46 and 53—53 of the sheath 40 be highly elastic so that the recovery of the sheath will be substantially instantaneous and precise in amount when the tensile forces are removed. The sheath extension and the coupling are accomplished so that when the stretched sheath 40 recovers, the resultant ratio of the lengths of the core 32 and the sheath 40 are a predetermined value such as 1.0000, for example. The recovery of the sheath occurs to a substantial degree as the cable 21 is taken up, and by the time the cable is run out and installed in the field, the core-to-sheath length ratio is as desired.

The portion 25 of the apparatus 20 which is used to couple the core to the sheath is shown in FIG. 1 and in greater detail in FIGS. 6-8. It includes a linear capstan 146 and a coupling sheave 150 which cooperate to produce the coupling after the sheath has been stretched and while it is under tension.

The linear capstan 146 is a component of the prior art cabling apparatus and is a well-known tractor capstan that is commercially available. It includes two endless belts 151—151 (see FIG. 6) between which the cable 21 is gripped and advanced as the belts are moved in opposite directions. Each belt of the capstan 146 is caused to be turned by a power train (not shown).

Cooperating with the linear capstan 146 to effect the sheath elongation and coupling is the sheave 150 (see FIGS. 7 and 8). The sheave 150 is mounted rotatably between side supports of a stand 152 and is power driven by a motor 153. From the sheave 150, the cable 21 is advanced to a takeup reel 154.

As can be seen in FIGS. 7 and 8, the sheave 150 includes guide means for causing each successive convolution of the cable 21 on the sheave to be moved transversely across a surface 156 of a hub 157 of the sheave. A plurality of fins 158—158 are mounted in a frame 159, and are adjacent to and span across the width of the hub 157. As the sheave 150 is turned rotatably, the fins 158—158 cause the convolutions of the cable 21 to be separated and each successive one to be moved toward one of the flanges 161—161 of the sheave. The movement of the convolutions across the hub 157 from a point to an exit point is helped by tapering the hub (see FIG. 8) so that its largest diameter is adjacent to the entry point of each convolution and smallest at the exit. The taper is slight and in a preferred embodiment is about 1° relative to an axis of generation of the hub.

The linear capstan 146 is a constant speed apparatus, but the rotational velocity of the coupling sheave 150 is variable. Through a feedback control system, the sheave velocity is controlled to obtain a desired tension in the sheath 40. Facilities which include a pressure transducer (not shown) are provided for measuring the tension in the sheath 40 as the cable 21 is passed over the sheave 150. A feedback loop is provided to cause the rotational velocity of the sheave 150 to be increased or decreased to change the sheath tension. With the arrangement of this invention, it is possible to provide a coupling of a core 32 and a sheath 40 for a number of different cable designs.

It is important that the large diameter powered sheave 150 be positioned between the linear capstan 146 and the take-up reel 154. Should it be positioned between the extruder 145 and the linear capstan 146, it would not be powered; consequently, the stretching of the sheath 40 would have to occur between the servers 115 and 143 and the sheave. Inasmuch as any contribution by the sheave in such a location to the tensile force which elongates the sheath 40 is somewhat fixed, the braking forces for the wire servers would have to be increased substantially from those used in the apparatus 20 in order to provide the desired elongation. Also the braking forces would have to be adjusted as a function of the core structure. These requirements on the servers are not necessary in the arrangement of this invention because the tension required for stretching the sheath 40 is generated between the linear capstan 146 and the large sheave 150. A constant braking force is applied by the wire servers for a number of different core constructions.

It also should be understood that the arrangement shown in FIG. 6 could be replaced with one which includes a linear capstan on each side of the sheave 150 (see FIG. 9). In that embodiment, the sheave 150 is free wheeling and receives cable from the linear capstan 146. A second linear capstan 171 is positioned adjacent to the output side of the sheave 150. Feedback control is provided for the capstan 171 to cause the tension in the cable 21 to be such that a controlled stretch of the sheath 40 occurs between the linear capstan 146 and the sheave 150. In that event, a transducer is mounted on the second capstan 171. The cable 21 is caused to be stretched between the two capstans, but the important elongation is that which occurs between the first linear capstan 146 and the coupling sheave 150.

An understanding of the core and sheath geometry is helpful to understanding how the methods and apparatus of this invention are used to cope with the problem of discrepancy in lengths. With the cable 21 disposed in convolutions on a reel, $r_i$ is used to designate the distance from the sheath centerline to the centerline of the core, and R is used to designate the distance from the sheath centerline to the reel centerline. When the cable 21 on the reel has not been processed through the apparatus 25 of this invention, the core 32 is under tension relative to the sheath 40 which results in the core being offset from the centerline of the sheath and in engagement with that portion of its surface adjacent to the reel hub. The length of the sheath 40 in one turn is $2\pi R$, and the minimum length of core under tension in one turn is $2\pi (R-r_i)$. Their difference is $2\pi r_i$.

As a result of the foregoing analysis, it should be apparent that for each wrap of the cable 21 around a sheave or reel, the loose fiber or ribbon core 32 can be shorter than the sheath 40 by a constant length difference. This constant depends on internal cable sheath geometry, core geometry, and strain conditions of both the core and sheath. The constant, which represents a core shortfall is independent of sheave or reel diameter and is equal to the above-identified quantity $2\pi r_i$. The shortfall results in a undue strain on the core when the cable 21 is installed such as, for example, in a straight run in the field. This strain which is defined as the quotient of $2\pi r_i$ and $2\pi R$ and which is referred to as geometric strain, can lead to instabilities of the core 32 during manufacturing as the cable 21 passes around multiple sheaves of different diameters.

As will be recalled, the apparatus 25 of this invention is effective to couple the core 32 to the sheath 40 after the sheath has been elongated between the linear capstan 146 and the large sheave 150. The amount of the extension of the sheath 40 between the linear capstan 146 and the sheave 150 is equal to the total strain of the core 32. That total strain is the sum of the above-mentioned geometric strain, a strain caused by ribbon payout tension, and, if desired, an increment which insures that the length of the core 32 in the final product exceeds the length of the sheath 40 in order to obtain the hereinbefore-mentioned core-to-length ratio between 1.0000 and 1.0007. The tension in the sheath 40 can be controlled by controlling the rotational velocity of the sheave 150 to compensate for the geometric strain, which comes about because the ribbon center is displaced from the center or neutral axis of the sheath, as well as the other strains. It should be apparent that the required tension will vary inasmuch as $r_i$ and hence the geometric strain varies as a function of the number of ribbons 34—34 in the core 32. In a preferred embodiment, the extension of the sheath 40 is controlled to equal the total strain including the last-mentioned increment thereof which results in the core 32 being under a slight compressive load in the final cable 21.

It has been determined that the coupling of the sheath 40 to the core 32 as the cable 21 is moved around the sheave 150 is a function of the quantity $e^{\mu\theta}$. In the last mentioned quantity, e is the base of Napierian or natural logarithms and is equal to 2.71828, $\mu$ is the coefficient of friction between the core 32 and the sheath 40 and $\theta$ is the angle of contact of the cable 21 with the sheave. For the cable 21, $\mu$ has a minumum value of about 0.75.

The cable 21 is wound, with its sheath 40 in a stretched condition, in a predetermined number, N, of turns on the sheave 150. The number of turns must be sufficient to achieve a coupling of the sheath 40 and the core 32 while the sheath is in the stretched condition. It has been found that three turns are sufficient and that five are more than adequate. In a preferred embodiment, the cable is wrapped in five turns about the sheave. In the apparatus 20, there is a back tension on the core 32 of about 1 lb. per ribbon or 12 lbs. for a twelve ribbon cable core. The 1 lb. ribbon tension equates to a core elongation or payout strain of about 0.04%. The coupling between the core 32 and the sheath 40 is sufficient so that the back tension on the core cannot cause the core to slip relative to the sheath to which it is coupled. The tensile pull to overcome the effect of the coupling sheave 150 is determined by the hereinbefore mentioned quantity $e^{\mu\theta}$. If $\mu$ has a value of 1, and $\theta = 2\pi$ radians for one wrap, then the exponent of e for the arrangement with five wraps is about $10\pi$ or approximately 30. Therefore, an extremely small force, i.e. less than 1/1,000,000 lb., is required on the output side of the coupling arrangement to balance the back tension on the other side when five wraps are used. This small tension on the output side is provided in a relatively small length of the cable between the sheave 150 and the takeup reel 154 by the weight and friction of the ribbon core 32.

Of importance to the successful coupling of the core 32 to the sheath 40 is the requirement that the diameter of each of the convolutions of the cable 21 on the coupling sheave 150 be larger than the diameter of any other convolution in which the cable having the core coupled to the sheath is subsequently wound. It has been found that successively increasing convolution diameters results in the application of increased tensile forces to the core 32 which it will be recalled is comprised of glass fibers. The movement of the cable 21 past sheaves which increase in diameter between at least two successive sheaves also results in an increasing shortfall of the core 32. This condition is referred to as pumping and is cumulative. The increased tensile forces applied to the core 32 in such an arrangement causes the ribbon core to be held against the sheave side of the tube 41 thereby increasing the geometric strain.

Accordingly, the apparatus 20 of this invention satisfies this requirement regarding diameters inasmuch as there is no sheave between the sheave 150 and the takeup reel and the diameter of the takeup reel is less than that of the coupling sheave. As a result, coupling sheave 150 has a diameter larger than all succeeding sheaves and larger than any subsequent convolution in which the cable 21 is wound whether it is coupled or decoupled.

For the inventive arrangement, it is also important that the diameter of the coupling sheave 150 be relatively large, and, in a preferred embodiment, is in the range of about nine feet. As will be recalled, the core 32 tends toward the inner side of the surrounding tube 41 as the cable 21 is moved about a sheave. The desired location is along the neutral axis of the cable 21. The larger the sheave, the more each increment of the cable 21 approaches a straight line. For an infinitely large diameter sheave, the core of each increment approaches a length equal to an increment along the neutral axis.

There are two additional reasons for the requirement that the sheave 150 have a relatively large diameter. First, if the sheave 150 has a relatively large diameter, it is easier to satisfy the condition that its diameter not be exceeded by the diameter of any subsequent convolution in which the coupled cable is wound.

Secondly, the smaller the sheave diameter, the greater the pounds or newtons of force required to compensate for the shortfall of the core 32. In a graph (see FIG. 10) with the abscissa being the sheave diameter and the ordinate being the pounds of force required to compensate for the geometric strain, the curve tends asymptotically toward the y axis. It will be recalled that the shortfall is independent of the sheave diameter; however, when the shortfall is expressed as a percent of the sheave circumference to arrive at the geometric strain, the percent becomes dependent on the diameter of the sheave. Therefore, for a smaller diameter sheave, the elongation of the sheath 40 must be greater than that for a larger sheave. As a result of the geometric strain increasing as the diameter of the sheave 150 decreases, the tensile force required to elongate the sheath 40 to compensate for the geometric strain increases as the diameter of the coupling sheave decreases. For a nine foot diameter sheave, the tensile force that must be applied to the sheath 40 to elongate the sheath is about 300 lbs. If the diameter is reduced to four feet, the required tension is 675 lb., while for three feet it becomes 900 lb. Such high tensile forces place severe requirements on the gripping capability of the linear capstan 146 and increase the probability for physical damage to the cable 21.

The coupling is temporary. When the cable 21 is free of tension, the core 32 and the sheath 40 are decoupled because of the elastic recovery of the composite sheath, and the lengths of the two are substantially equal. In the preferred embodiment, the cable 21 is decoupled as it advanced off the sheave 150 and moved to the takeup reel 154. If the cable 21 were to be taken up under tension which is sufficient to maintain the coupling, the cable would be decoupled when it is installed in the field.

As the cable 21 is payed off the sheave 150 and as the tensile force in the sheath is reduced, the sheath recovers to an original length because of the strength members. The tension in the cable core 32 between the coupling sheave 150 and the takeup reel 154 is essentially zero. The sheath 40 on the takeup reel typically is under a relatively small tension which is sufficient to provide a takeup package that is suitable for shipping and/or subsequent handling. By the time the cable 21 has been wound on the takeup reel 154, sufficient core 32 has been carried forward with the sheath 40 on the output side of the sheave 150 to cause the ratio of core and sheath lengths to be a predetermined value, and the core and the sheath are substantially decoupled.

What is generally sought is a zero difference between the cable sheath 40 and core 32 when the cable 21 is installed in the field. Removing substantially all the tensile forces causes the sheath 40 to recover by an amount equal to the sum of the core geometric and payout strains to cause the core and sheath lengths to be substantially equal. However, as will be recalled, in the preferred embodiment, the sheath 40 is elongated by an amount equal to the total core strain which includes a predetermined increment in addition to the geometric strain and the payout strain. As a result, when the sheah 40 recovers elastically, the core length exceeds the sheath length slightly and the core is under a slight compressive load.

It is to be understood that the above-described arrangements are simply illustrative of the invention. Other arrangements may be devised by those skilled in the art which will embody the principles of the invention and fall within the spirit and scope thereof.

What is claimed is:

1. A method of controlling the length of a lightguide fiber core relative to the length of an enclosing composite sheath of a cable in which relative movement between the core and sheath can occur and in which the sheath includes reinforcing members having a relatively high modulus of elasticity and a plastic jacket, said method comprising the steps of:
   advancing the cable along a path of travel;
   elongating the sheath relative to the core along a portion of the path by applying tensile forces to the sheath; and
   coupling the core to the elongated sheath to prevent relative movement therebetween by moving the cable in a predetermined number of circular convolutions each of which has a diameter that exceeds the diameter of any subsequent convolution in which the coupled cable is wound, said elongating and coupling steps cooperating to allow sufficient additional length of the core to be advanced relative to the sheath to cause the ratio of the lengths of the core and the sheath to be a predetermined value when the tensile forces are reduced and the composite sheath allowed to return elastically to its original length.

2. The method of claim 1, wherein subsequent to said coupling step, the cable is taken up and tensile forces in the cable between the predetermined number of convolutions and convolutions being taken up are controlled to cause the core length in the convolutions being taken up to be at least equal to the sheath length.

3. The method of claim 1, wherein said step of coupling the core to the sheath by the moving the cable in a predetermined number of convolutions is accomplished at a predetermined velocity and the predetermined velocity is capable of being changed to cause the tension in the cable in the predetermined number of convolutions to be sufficient to cause the elongation of the sheath.

4. The method of claim 1, wherein the portion of the path is a first straight portion of the path and subsequent to the moving of the cable in the predetermined number of convolutions said method includes the step of advancing the cable at a predetermined velocity along a second straight portion of the path of travel of the cable.

5. The method of claim 4, wherein said step of advancing the cable at a predetermined velocity after the moving of the cable in a predetermined number of convolutions is capable of varying the velocity of the cable along the second straight portion of the path of travel to control thetension in the cable between the first straight portion of the path of travel and the predetermined number of convolutions.

6. The method of claim 1, wherein the predetermined number of convolutions is in the range of 3 to 5.

7. The method of claim 1, wherein the diameter of each convolution of the predetermined number is about nine feet.

8. The method of claim 1, wherein the strength members are made of a material which has a modulus of elasticity that is at least about 10,000,000 psi.

9. The method of claim 1, wherein the predetermined number of convolutions are wound on a sheave, and the sheath is caused to be elongated along the portion of the path prior to the sheave, the rotational velocity of the sheave being sufficient to cause the cable in the convolutions to be subjected to a tension force which is effective to elongate the sheath to allow sufficient additional core to be advanced relative to the elongated sheath to cause the length of the core to be substantially equal to the length of the sheath when the tension to which the cable is subjected is substantially negligible.

10. The method of claim 1, wherein each of the plurality of convolutions has a diameter that is greater than the diameter of any convolutions in which the cable is subsequently wound.

11. An apparatus for controlling the length of a lightguide fiber core of a cable relative to the length of a composite sheath system, said apparatus comprising:
means for supplying a core of lightguide fibers;
means disposed along a path of travel of the fibers for enclosing the core in a sheath system, which includes at least one plastic jacket and strength members having a relatively high modulus of elasticity and extending coextensively with the core, such that relative movement may occur between the core and the sheath system;
means including a reel for taking up the cable;
first moving means interposed between said enclosing means and said means for taking up the cable for advancing the cable at a substantially constant velocity along a portion of the path of travel; and
second moving means disposed between said first moving means and the takeup reel and cooperating with said first moving means for elongating the sheath relative to the core along the portion of the path of travel by applying tensile forces to the sheath and for coupling the core to the elongated sheath to prevent relative movement therebetween by causing the cable to be moved in a predetermined number of convolutions each of which has a diameter that exceeds the diameter of any convolution in which the coupled cable is subsequently wound, the elongating and coupling of the sheath being effective to allow sufficient additional length of the core to be advanced relative to the sheath to cause the ratio of the length of the core and that of the sheath to have a predetermined value when the tensile forces are reduced and the composite sheath allowed to return elastically to its original length.

12. The apparatus of claim 11, wherein said first and second moving means are effective to cause the length of the core to be substantially equal to that of the sheath when the composite sheath returns to its original length.

13. The apparatus of claim 12, wherein said second moving means is such that the velocity of the cable in the predetermined number of convolutions is capable of being varied to cause the tension in the cable to be sufficient to elongate the sheath between said first and said second moving means.

14. The apparatus of claim 11, wherein the portion of the path along which the sheath is elongated is a first straight portion and wherein said second moving means includes a sheave and moving means interposed between said sheave and said taking up means for advancing the cable along a second straight portion of the path of travel.

15. The apparatus of claim 14, wherein said sheave is rotatably mounted and said moving means between said sheave and said taking up means causes the cable to be moved around said sheave at a velocity sufficient to cause sufficient tension in the cable between the first moving means and said sheave to elongate the cable therealong.

16. The apparatus of claim 11, wherein said second moving means includes a sheave having a diameter of about nine feet.

17. The apparatus of claim 11, wherein said first moving means includes a linear capstan.

18. The apparatus of claim 11, wherein said second moving means includes a sheave which is controlled to impart a predetermined tension to the cable between said first moving means and said sheave.

19. The apparatus of claim 18, wherein the sheave is controlled to impart tensile forces to the sheath which are sufficient to cause the coupling.

20. The apparatus of claim 19, wherein said second moving means also includes guide means for causing each successive convolution on said sheave to move transversely across a hub of said sheave.

21. The apparatus of claim 20, wherein said hub of said sheave is tapered such that as said guide means causes each successive convolution to be moved across said hub, said each successive convolution is moved to a smaller diameter portion of said hub.

22. A cable which is made in accordance with the method of claim 1.

23. A cable which is made in accordance with the method of claim 2.

* * * * *